(12) United States Patent
Takahashi

(10) Patent No.: US 10,353,575 B2
(45) Date of Patent: Jul. 16, 2019

(54) DISPLAY CONTROL APPARATUS, METHOD FOR CONTROLLING THE SAME, AND RECORDING MEDIUM

(71) Applicant: CANON KABUSHIKI KAISHA, Tokyo (JP)

(72) Inventor: Tsukasa Takahashi, Miura-gun (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 317 days.

(21) Appl. No.: 15/280,865

(22) Filed: Sep. 29, 2016

(65) Prior Publication Data

US 2017/0097764 A1 Apr. 6, 2017

(30) Foreign Application Priority Data

Oct. 6, 2015 (JP) .................. 2015-198759

(51) Int. Cl.
*G06F 3/0481* (2013.01)
*G06F 3/0488* (2013.01)
*G06F 3/0484* (2013.01)
*G06F 3/0486* (2013.01)
*H04N 5/232* (2006.01)
*G06F 3/0482* (2013.01)

(52) U.S. Cl.
CPC ........ *G06F 3/04883* (2013.01); *G06F 3/0481* (2013.01); *G06F 3/0482* (2013.01); *G06F 3/0486* (2013.01); *G06F 3/04845* (2013.01); *G06F 3/04886* (2013.01); *H04N 5/23293* (2013.01); *G06F 3/0488* (2013.01); *G06F 3/04842* (2013.01)

(58) Field of Classification Search
CPC .. G06F 3/0481; G06F 3/04842; G06F 3/0482; G06F 3/0488; G06F 3/04883; G06F 3/04845; G06F 3/0486; H04N 5/23293
See application file for complete search history.

(56) References Cited

U.S. PATENT DOCUMENTS 7,017,118 B1 * 3/2006 Carroll ................. G06F 3/0481
345/160
2006/0107231 A1 * 5/2006 Matthews ............. G06F 3/0481
715/788

(Continued)

FOREIGN PATENT DOCUMENTS

JP 2014-207006 A 10/2014

*Primary Examiner* — Tuyetlien T Tran
(74) *Attorney, Agent, or Firm* — Canon USA, Inc. IP Division

(57) ABSTRACT

A touched display item from among a plurality of display items is dragged by a touch operation, and in a case where an amount of movement of the touch operation is less than a predetermined distance in a second direction, a plurality of items located between an original position of the touched display item and a current position of the touched display item are moved, and in a case where the amount of movement of the touch operation is greater than or equal to the predetermined distance in the second direction, in a case where the touch operation ends, the touched display item is inserted where the touch operation ended and a display item located at the position where the touched display item is inserted is moved to the original position of the touched display item.

15 Claims, 10 Drawing Sheets

(56) References Cited

U.S. PATENT DOCUMENTS

| | | | |
|---|---|---|---|
| 2007/0265930 A1* | 11/2007 | Mohr | G06F 3/0481 |
| | | | 705/26.1 |
| 2007/0288860 A1* | 12/2007 | Ording | G06F 3/04842 |
| | | | 715/779 |
| 2010/0070931 A1* | 3/2010 | Nichols | G06F 3/0488 |
| | | | 715/863 |
| 2012/0054663 A1* | 3/2012 | Baek | G06F 9/451 |
| | | | 715/772 |
| 2012/0299933 A1* | 11/2012 | Lau | G06T 13/80 |
| | | | 345/473 |
| 2013/0044141 A1* | 2/2013 | Markiewicz | G06F 3/0485 |
| | | | 345/684 |
| 2013/0176256 A1* | 7/2013 | Hara | G06F 3/0485 |
| | | | 345/173 |
| 2016/0246471 A1* | 8/2016 | Stephenson | G06F 3/0482 |

\* cited by examiner

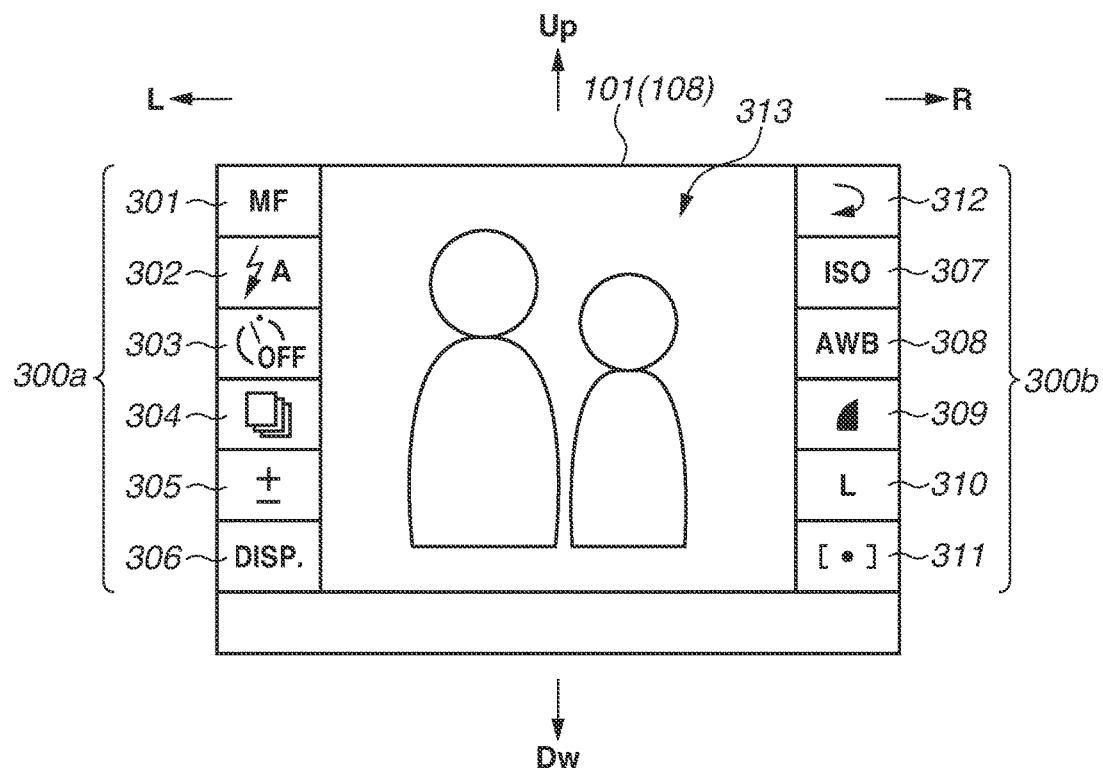
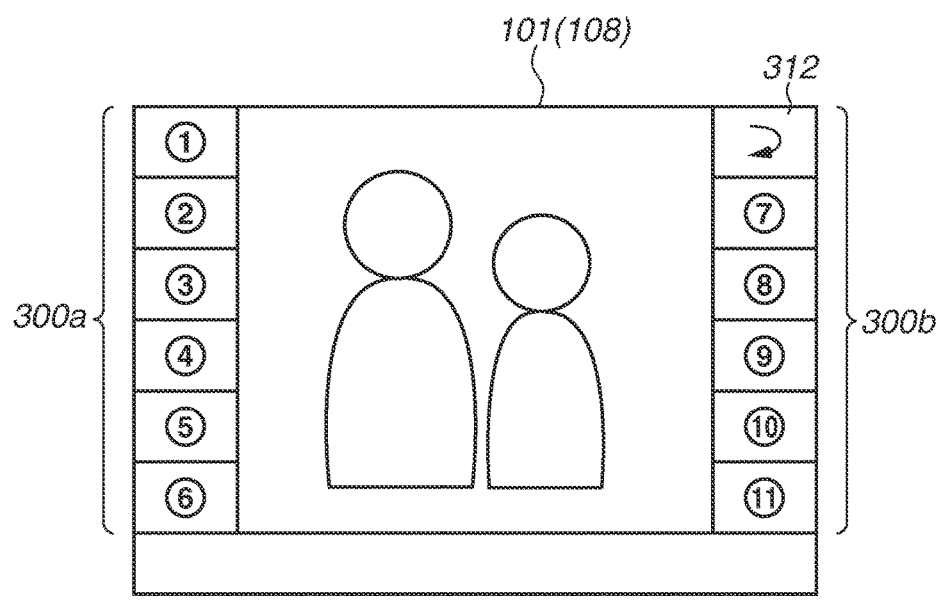

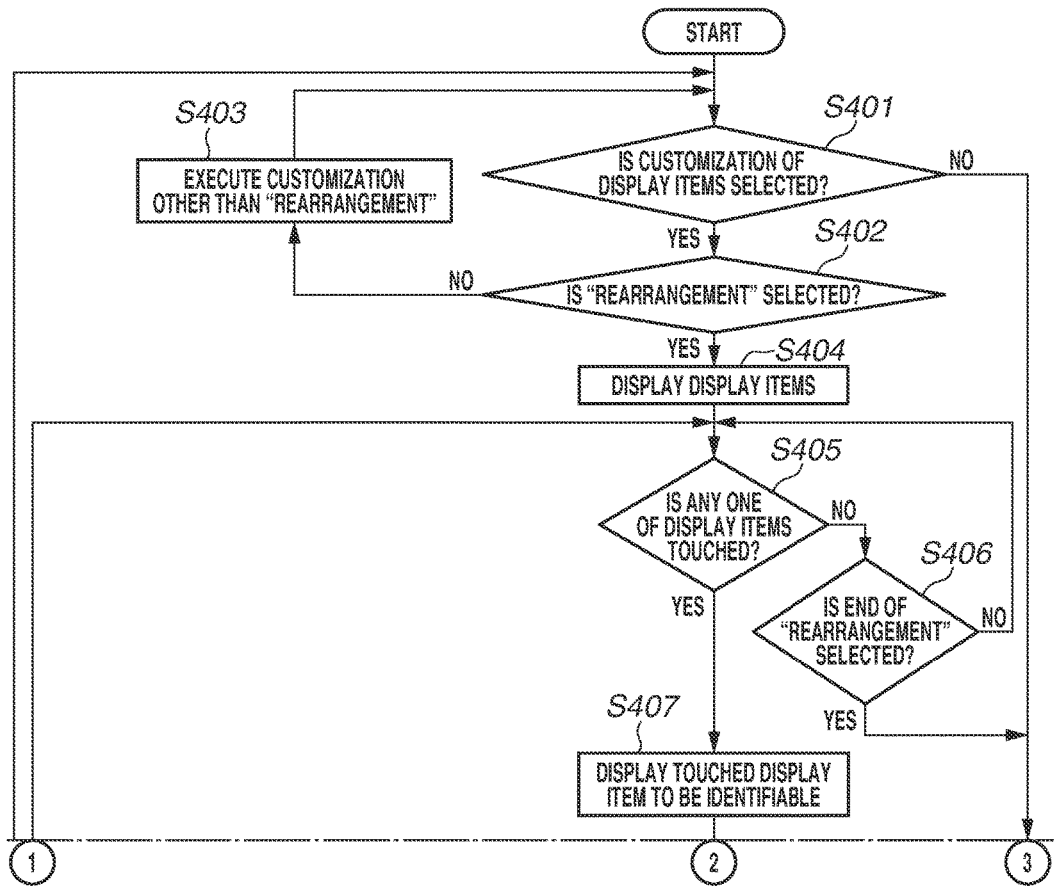

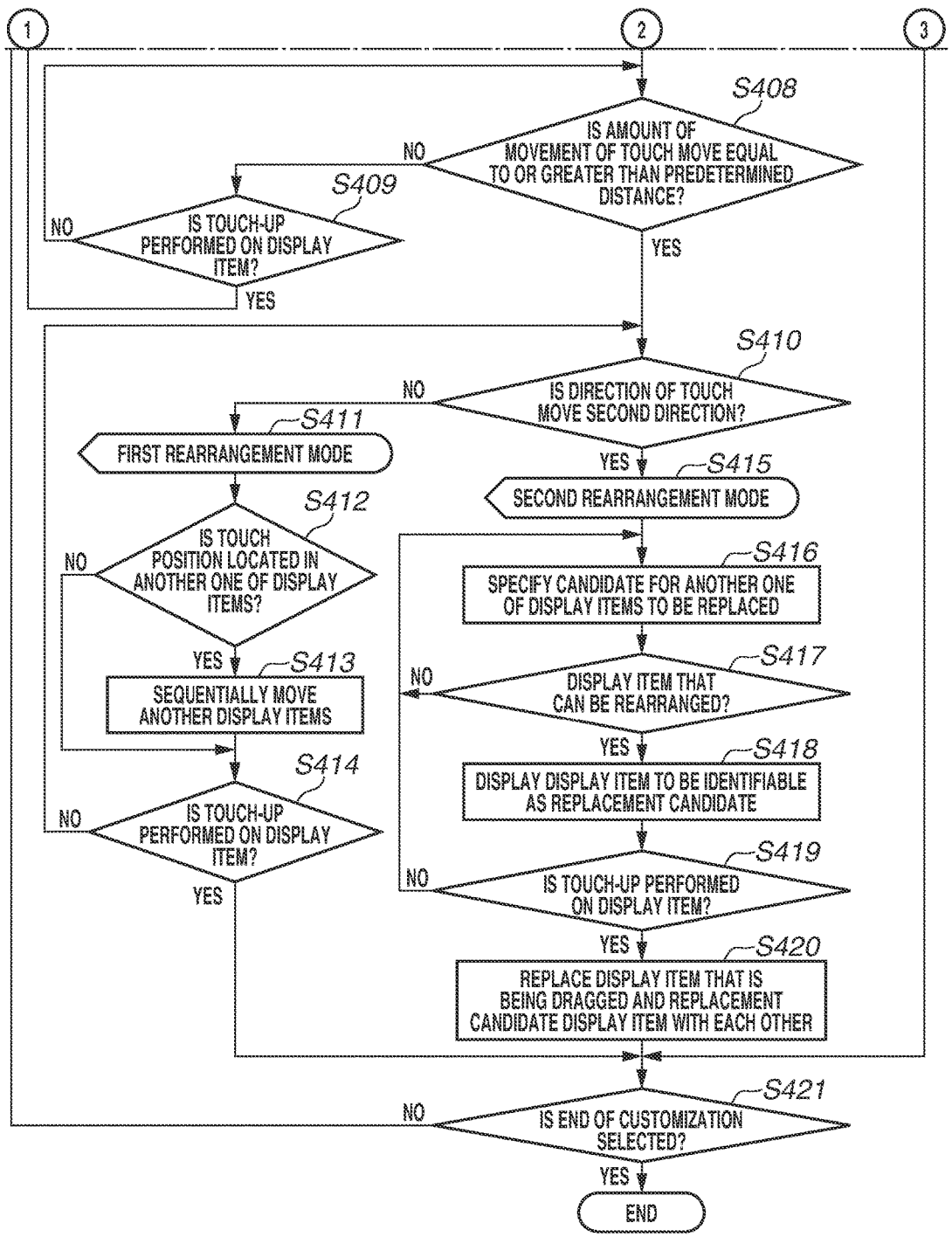

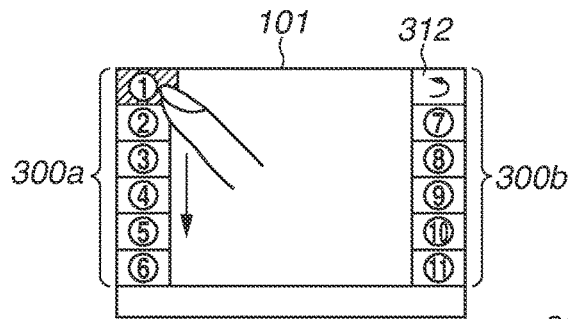
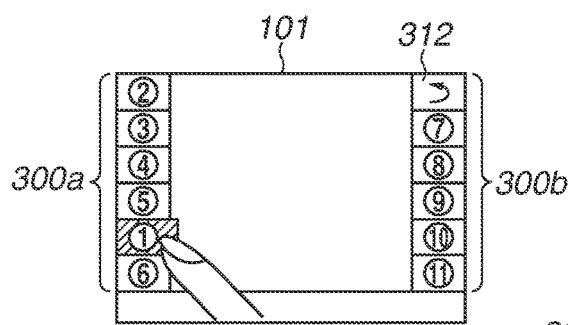
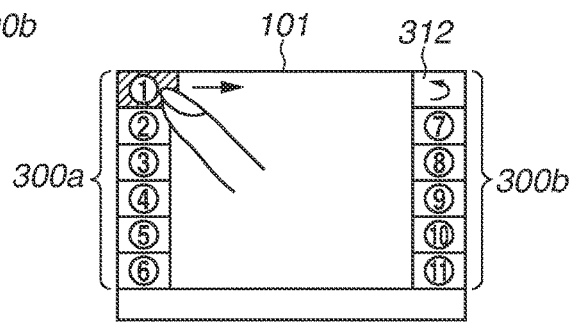
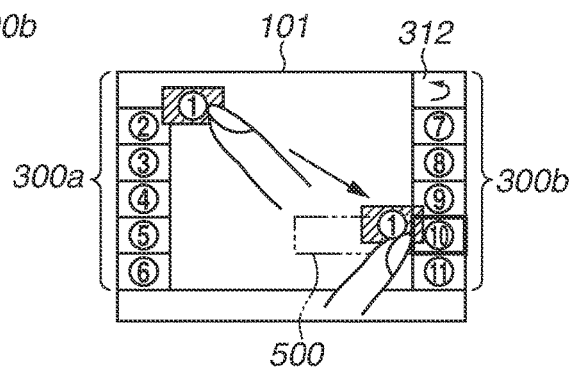
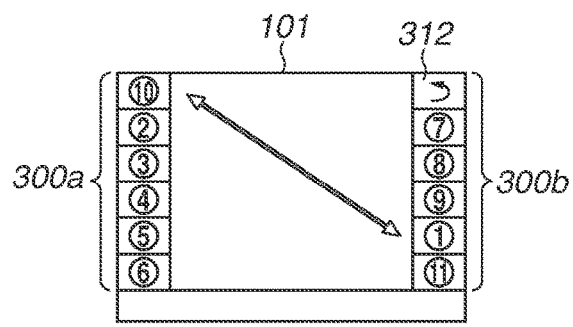

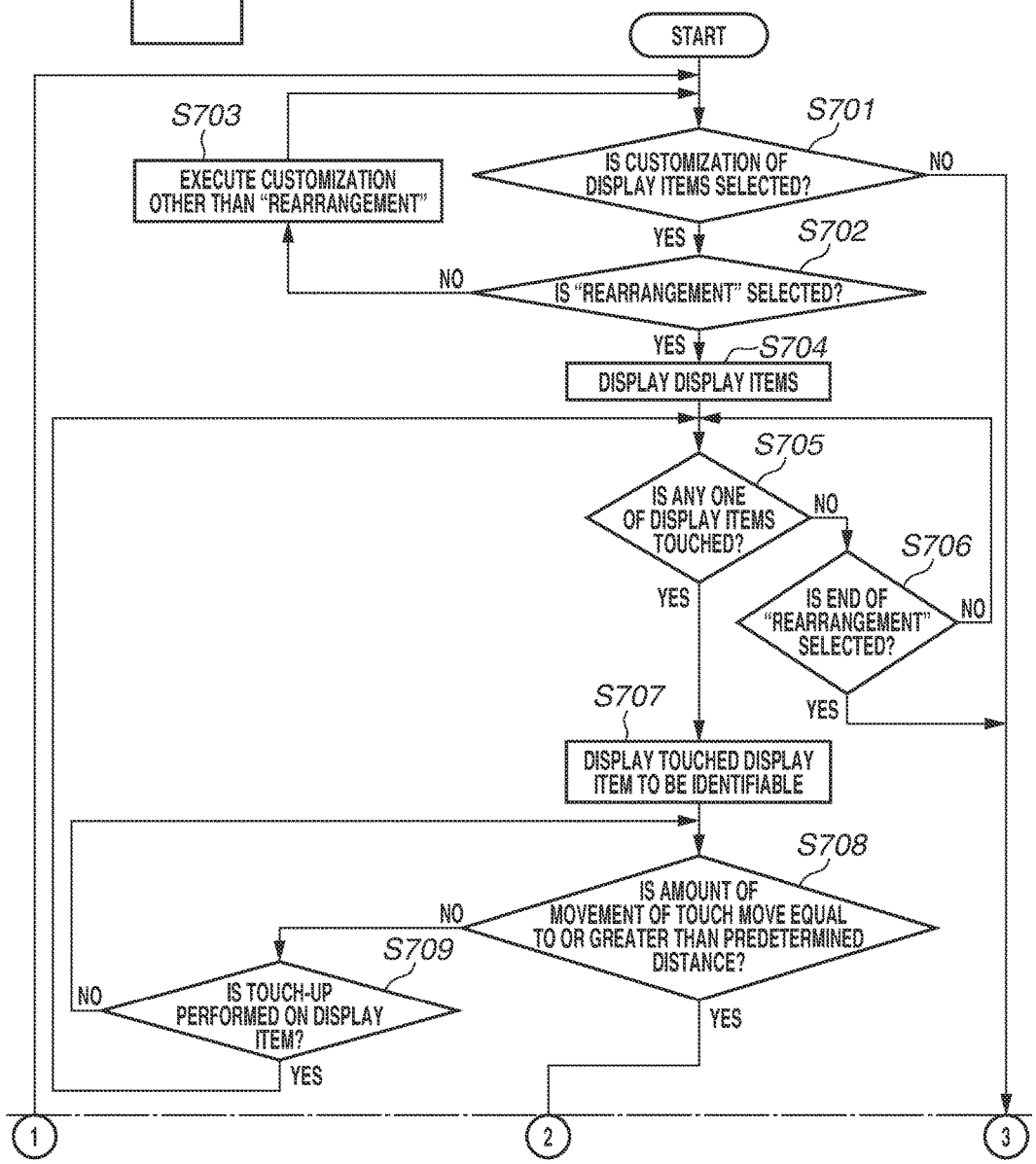

DISPLAY CONTROL APPARATUS, METHOD FOR CONTROLLING THE SAME, AND RECORDING MEDIUM

BACKGROUND

Field

Aspects of the present invention generally relate to a display control apparatus, a method for controlling a display control apparatus, and a recording medium.

Description of the Related Art

A display control apparatus for displaying on a display device a display item assigned a specific function and detecting a touch operation on the display item is known. Japanese Patent Application Laid-Open No. 2014-207006 discusses a display control apparatus where the position of a display item can be customized according to a user's touch operation. In the display control apparatus discussed in Japanese Patent Application Laid-Open No 2014-207006, a user performs a touch operation on a target display item to move the target display item to a position desired by the user, and also to replace a display item present at the movement destination with the target display item. Thus, the user can place the target display item at the position desired by the user.

In a case where another display item is present between the target display item and the display item at the movement destination, and if the position of the target display item is changed, the order of the display item at the movement destination and another display item is also changed. To change the position of the target display item to the position desired by the user while maintaining the order of the display item at the movement destination and another display item, the touch operation of the user can become cumbersome.

If the user wants to simply replace the target display item and the display item at the movement destination with each other, it is not necessary to maintain the rearrangement order of the display item at the movement destination and another display item.

When rearranging display items, it is advantageous for a user to be able to rearrange the display items as the user desires.

SUMMARY OF THE INVENTION

Aspects of the present invention are generally directed to a display control apparatus and a control method enabling a user to easily rearrange display items as desired by the user.

A display control apparatus includes a touch detection unit configured to detect a touch operation on a display unit, a display control unit configured to perform control so that a plurality of display items are displayed on the display unit arranged in a first direction, and a control unit configured to move a display item from among the plurality of displayed display items via a touch operation, perform, in a case where an amount of movement of the touch operation is less than a predetermined distance in a second direction different from the first direction, first rearrangement control for moving, from among the plurality of display items, a plurality of items located between an original position of the display item before it is moved and a current position of the display item, in a direction of the original position, and perform, in a case were the amount of movement of the touch operation is greater than or equal to the predetermined distance in the second direction, second rearrangement control for, when the touch operation on the display item ends, inserting the display item at a position corresponding to a position where the touch operation ends and moving another display item located at the position where the display item was inserted to the original position of the display item.

Further features of aspects the present invention will become apparent from the following description of exemplary embodiments with reference to the attached drawings.

BRIEF DESCRIPTION OF THE DRAWINGS

FIGS. 3A and 3B are diagrams illustrating examples of display items.

FIG. 4 (consisting of FIGS. 4A and 4B) is a flowchart illustrating rearrangement control according to a first exemplary embodiment.

FIGS. 6A-1, 6A-2, 6B-1, 6B-2, and 6B-3 are diagrams illustrating examples of rearrangement according to the first exemplary embodiment.

FIGS. 8A-1, 8A-2, 8A-3, 8B-1, 8B-2, 8B-3, and 8B-4 are diagrams illustrating examples of rearrangement according to the second exemplary embodiment.

DESCRIPTION OF THE EMBODIMENTS

An exemplary embodiment of the present invention will be described in detail below with reference to the accompanying drawings.

The following exemplary embodiments are merely examples for implementing aspects of the present invention and can be appropriately modified or changed depending on individual constructions and various conditions of apparatuses to which the aspects of the present invention are applied. Thus, the aspects of the present invention are in no way limited to the following exemplary embodiments.

In the following exemplary embodiment, a case is described where a digital camera is employed as an example of a display control apparatus according to aspects of the present invention.

Figure 1:
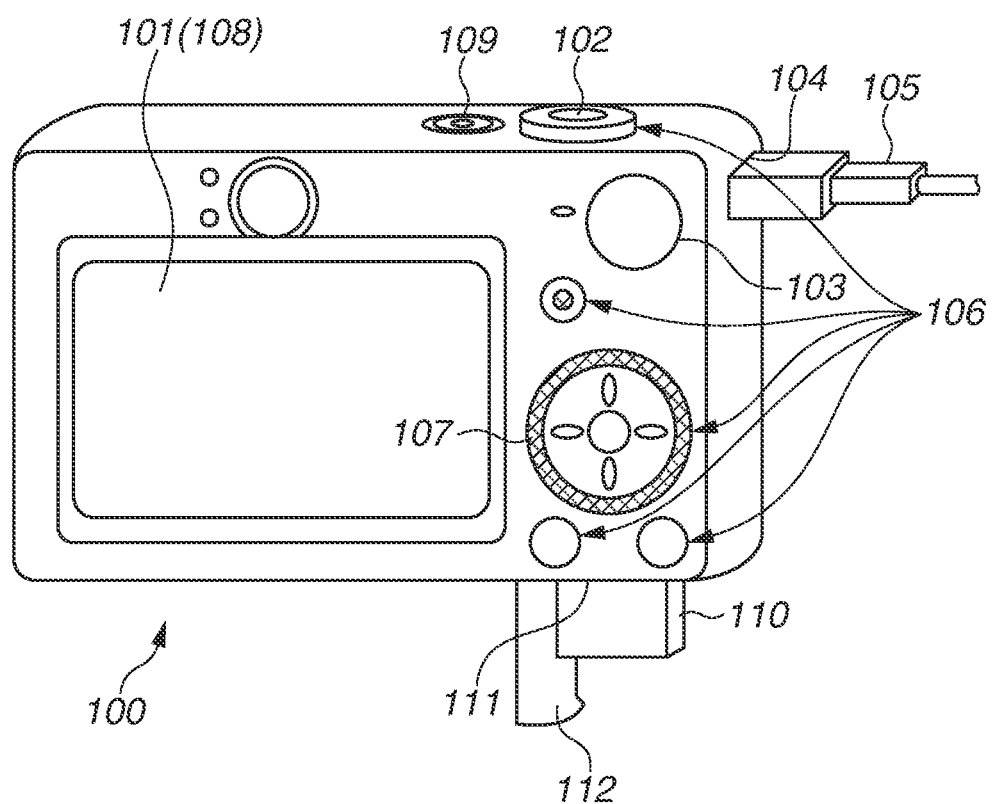
FIG. 1 is an external view illustrating an example of an external configuration of a digital camera.

FIG. 1 is a diagram illustrating the external configuration of a digital camera 100 according to a first exemplary embodiment.

Display unit 101 is an example of a display unit and displays an image and various pieces of information. In the present exemplary embodiment, the display unit 101 includes a rectangular display screen with a long side and a short side. A shutter button 102 is a button for a user to provide imaging instructions. A mode selection switch 103 is a switch enabling the user to switch between various modes. A connector 104 is a connection portion that a connection cable 105 is connected to for communicating with an external device.

An operation unit 106 receives various operation-related inputs from the user. The operation unit 106 includes operation members such as various switches, buttons, a touch wheel 107, and a touch panel 108 arranged on the screen of the display unit 101.

A power switch 109 is a push button for switching the power supply on and off. A recording medium 110 is a memory card or a hard disk. The recording medium. 110 can be mounted in a recording medium slot 111. The recording medium 110 mounted in the recording medium slot. 111 can communicate with the digital camera 100 and can be used to record or reproduce image data. The recording medium slot 111 is closed by a cover 112.

Figure 2:
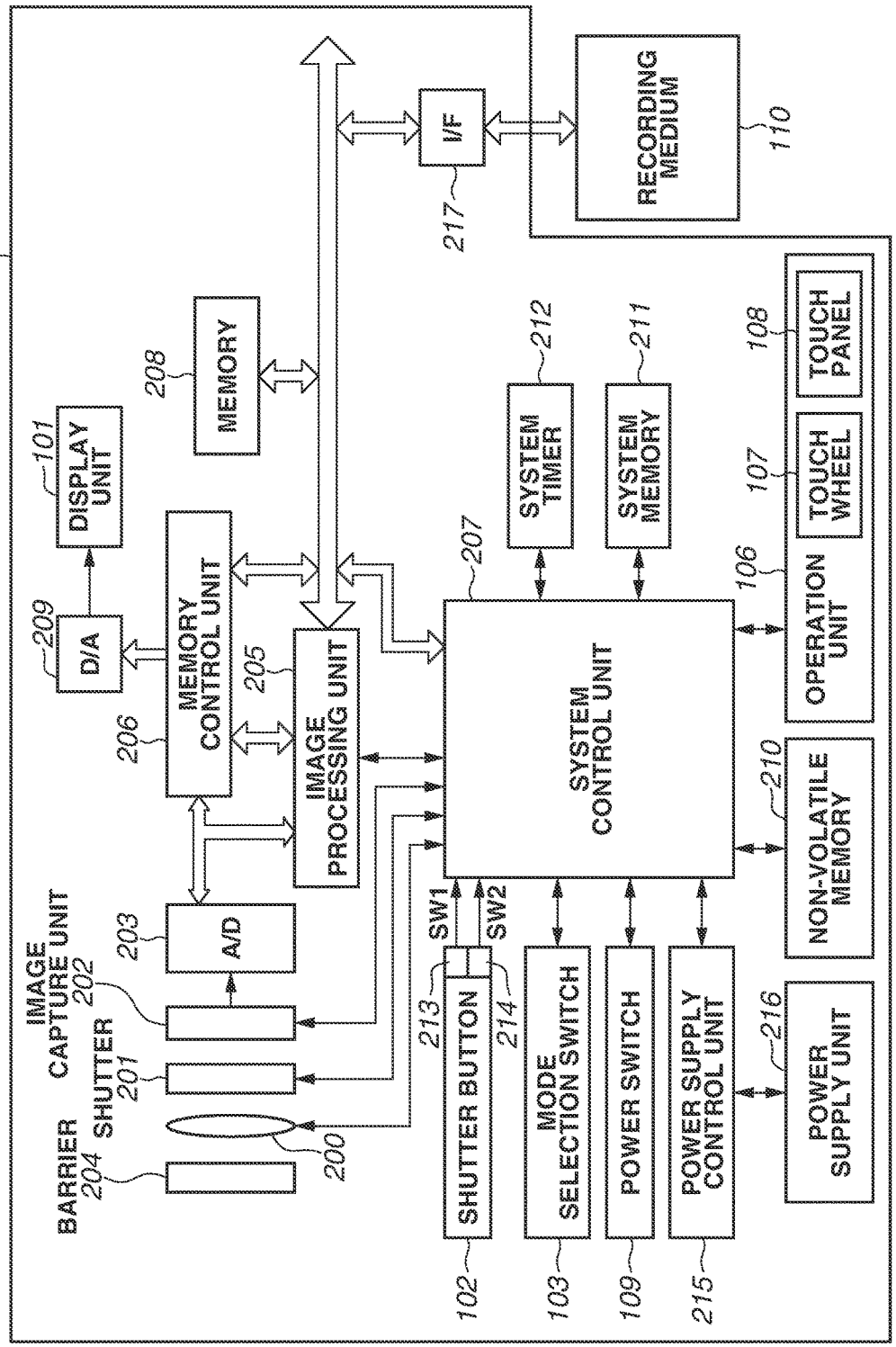
FIG. 2 is a block diagram illustrating an example of an internal configuration of the digital camera.

FIG. 2 is a block diagram illustrating an internal configuration of the digital camera 100. The same components as those in FIG. 1 are designated by the same numerals, and the description of these components is appropriately omitted.

An imaging lens 200 is a lens group including a zoom lens and a focus lens. A shutter 201 includes a diaphragm function. An image capture unit 202 is an image sensor including a charge-coupled device (COD) or a complementary metal-oxide-semiconductor (CMOS) device, which converts, an optical image into an electric signal. An analog-to-digital (A/D) converter 203 converts an analog signal output from the image capture unit 202 into a digital signal. A barrier 204 covers the imaging lens 200, thereby preventing stains on and breakage of the imaging system, including the imaging lens 200, the shutter 201, and the image capture unit 202.

An image processing unit 205 performs a resizing process, such as predetermined pixel interpolation and reduction, and a color conversion process on image data from the A/D converter 203 or image data from a memory control unit 206. The image processing unit 205 also performs a predetermined calculation process using captured image data. A system control unit 207 performs exposure control and distance measurement control based on the obtained calculation result. With this process, an autofocus (AF) process, an automatic exposure (AE) process, and a pre-flash (EF) process are performed using a through-the-lens (TTL) method. The image processing unit 205 also performs a predetermined calculation process using captured image data and performs an auto white balance (AWE) process using the TTL method based on the obtained calculation result.

Image data from the A/D converter 203 is written directly to a memory 208 via the image processing unit 205 and the memory control unit 206 or via the memory control unit 206. The memory 208 stores image data obtained by the image capture unit 202 and converted into digital data by the A/D converter 203, and image data to be displayed on the display unit 101. The memory 208 includes a sufficient storage capacity for storing a predetermined number of still images and a predetermined time period of a moving image and a sound. The memory 208 is also used as a memory for image display (video memory).

A digital-to-analog (D/A) converter 209 converts image data for display stored in the memory 208 into an analog signal and supplies the analog signal to the display unit 101. Thus, the image data for display written in the memory 208 is displayed on the display unit 209 via the D/A converter 209. The display unit 101 performs display on a display device, such as a liquid crystal display (LCD), according to an analog signal from the D/A converter 209. Analog signals are once converted into digital signals by the A/D converter 203, the digital signals are accumulated in the memory 208, and the accumulated digital signals are converted into analog signals by the D/A converter 209. Then, the analog signals are sequentially transferred to and displayed on the display unit 101, thereby displaying a live view image (live view display). Thus, the display unit 101 functions as an electronic viewfinder.

A non-volatile memory 210 is an electrically erasable and recordable memory and is, for example, an Electrically Erasable Programmable Read-Only Memory (EEPROM). The non-volatile memory 210 stores constant values for the operation of the system control unit 207, a management table (described below), and a program. The program is a program for executing the processing of a flow chart in the present exemplary embodiment as described below.

The system control unit 207 controls the entire digital camera 100. The system control unit 207 corresponds to examples of a touch detection unit, a display control unit, and a control unit. The system control unit 207 executes the program stored in the non-volatile memory 210 in the present exemplary embodiment to achieve processes described below. The system control unit 207 also controls the memory 208, the D/A converter 209, and the display unit 101 to perform display control. A system memory 211 is, for example, a random-access memory (RAM). Constants and variables for the operation of the system control unit 207 and a program read from the non-volatile memory 210 are loaded into the system memory 211. A system timer 212 is a time measurement unit for measuring the time used for various types of control and the time of a built-in clock (not illustrated).

The mode selection switch 103, a first shutter switch 213, a second shutter switch 214, and the operation unit 106 are used to input various operation instructions to the system control unit 207.

The mode selection switch 103 can switch the operation mode to any one of a still image recording mode, a moving image recording mode, and a reproduction mode. The system control unit 207 sets the operation mode switched by the mode selection switch 103. Operation modes included in the still image recording mode include an auto imaging mode, an auto scene determination mode, a manual mod, various scene modes in which imaging settings are made for each imaging scene, a program AE mode, and a custom mode. The mode selection switch 103 can directly switch the operation mode to any one of the above operation modes included in a menu button (not illustrated). The mode selection switch 103 can switch the operation mode to the still image recording mode and then, using another operation member, switch the still image recording mode to any one of the operation modes included in the menu button. Similarly, the moving image recording mode can also include a plurality of operation modes.

The first shutter switch 213 is turned on halfway during the operation, i.e., half press (imaging preparation instruction), of the shutter button 102 and generates a first shutter switch signal SW1. In response to the first shutter switch signal SW1, the system control unit 207 starts the operations of an AF process, an AE process, an AWB process, and an EF process.

The second shutter switch 214 is turned on by the full the operation, i.e., full press (imaging instruction), of the shutter button 102 and generates a second shutter switch signal SW2. In response to the second shutter switch signal SW2, the system control unit 207 starts a series of operations of an imaging process from the reading of a signal from the image capture unit 202 to the writing of image data to the recording medium 110.

The operation members of the operation unit 106 are appropriately assigned functions for corresponding scenes by the operation of selecting various display items displayed on the display unit 101 and act as various function buttons. The function buttons include, for example, an end button, a return button, an advance-image button, a jump button, a narrow-down button, and a change-attributes button. For example, if the menu button is pressed, a menu screen where various settings can be made is displayed on the display unit 101. The user can intuitively make various settings using the menu screen displayed on the display unit 101, four-directional buttons of up, down, left, and right directions, and a SET button. Further, if a FUNC button included in the operation unit. 106 is pressed, a FUNC menu screen is displayed superimposed on a live view image so that the user can set the exposure and a self-timer.

A power supply control unit 215 includes a battery detection circuit, a direct-current-to-direct-current (DC/DC) converter, and a switch circuit for switching blocks to apply a current. The power supply control unit 215 detects a presence or absence of attachment of a battery, a type of a battery, and a remaining capacity of a battery. Further, the power supply control unit 215 controls the DC/DC converter based on these detection results and an instruction from the system control unit 207 and supplies a required voltage to the components including the recording medium 110 for a required period of time. A power supply unit. 216 includes a primary battery such as an alkaline battery and a lithium battery, a secondary battery such as a nickel-cadmium (NiCd) battery, a nickel-metal hydrate (NiMH) battery, and a lithium-ion (Li) battery, and an alternating current (AC) adapter. A recording medium interface (I/F) 217 is an interface with the recording medium 110. The recording medium 110 is composed of a semiconductor memory or a magnetic disk.

The operation unit 106 includes the touch wheel 107 and the touch panel 108.

The touch wheel 107 is an operation member that rotates and is used together with the four-directional buttons of up, down, left, and right directions to indicate a selection item.

The touch panel 108 detects contact with respect to the display unit 101. The touch panel 108 and the display unit. 101 can be formed in an integrated manner. For example, the touch panel 108 is attached to an upper layer of the display surface of the display unit 101 so that the transmittance of light of the touch panel 108 does not hinder the display of the display unit 101. Then, input coordinates, on the touch panel 108 are associated with display coordinates on the display unit 101, whereby a graphical user interface (GUI) can be configured as if the user can directly operate a screen displayed on the display unit 101. The touch panel 108 can be of any of various types, such as a resistive type, an electrostatic capacitance type, a surface acoustic wave type, an infrared type, an electromagnetic induction type, an image recognition type, and a photo-sensor type. While a method for detecting a touch according to either contact with the touch panel 108 or the approach of a finger or a pen to the touch panel 108 is employed depending on the type, either can be used.

The system control unit 207 can detect the following operations of the user on the touch panel 108 or the following states:
(1) The state where a finger or a pen that has not touched the touch panel 108 newly touches the touch panel 108, i.e., the start of a touch (referred to as a "touch-down")
(2) A state where the finger or the pen is touching the touch panel 108 (referred to as a "touch-on")
(3) The state of moving the finger or the pen while the finger or the pen keeps touching the touch panel 108 (referred to as a "touch move")
(4) A state where the finger or the pen that has been touching the touch panel 108 is removed, i.e., the end of a touch (referred to as a "touch-up")
(5) The state where nothing touches the touch panel 108 (referred to as a "touch-off")

The system control unit 207 is notified, via an internal bus, of the above operations and states and the position coordinates where the finger or the pen touches the touch panel 108. Based on the received information, the system control unit 207 determines what operation is performed on the touch panel 108. In a case of a touch move, the system control unit 207 can determine, based on changes in the position coordinates, the moving direction of the finger or the pen moving on the touch panel 108 with respect to each of the vertical and horizontal components on the touch panel 108. If the user continuously performs a touch-down, a touch move of a certain distance, and a touch-up on the touch panel 108, the user is regarded as drawing a stroke. The operation of quickly drawing a stroke is referred to as a "flick". A flick is an operation of quickly moving the finger for a certain distance while the finger keeps touching the touch panel 108, and then separating the finger from the touch panel 108 immediately after the quick movement. In other words, a flick is the operation of quickly tracing the touch panel 108 with the finger in a flipping manner. If a touch move of greater than or equal to a predetermined distance at a speed greater than or equal to a predetermined speed is detected and a touch-up is detected immediately after the move, the system control unit 207 determines that a flick is performed.

Next, a description will be provided of rearrangement control of display items displayed on the display unit 101 of the digital camera 100. The description references, as examples of the display items, display items displayed on the FUNC menu screen for setting various imaging conditions of the digital camera 100.

FIG. 3A is a diagram illustrating an example of the FUNC menu screen displayed on the display unit 101. In response to the user pressing the FUNC button of the operation unit 106, the system control unit 207 displays on the display unit 101 the FUNC menu screen illustrated in FIG. 3A. Hereinafter, for description purposes, directions are referred to as "up (Up)", "down (Dw)", "right (R)", and "left (L)" based on the state of facing the display unit 101.

The system control unit 207 acquires information of the operation mode set using the mode selection switch 103 and displays a FUNC menu screen according to the operation mode on the display unit 101. In the present exemplary embodiment, it is assumed that the mode selection switch 103 is set to the still image recording mode. Accordingly, the system control unit 207 refers to a management table of display items stored in the non-volatile memory 210 and acquires information of display items according to the still image recording mode. The information of the display items includes display data of the display items and position information (position coordinates) of the positions where the display items are displayed. Based on the acquired information, the system control unit 207 displays a plurality of display items superimposed over a live view image on the display unit 101.

More specifically, in FIG. 3A, a first display item group 300a and a second display item group 300b are displayed at positions separated from each other in the horizontal direction of the display unit 101. The first display item group 300a includes a plurality of display items 301 to 306 arranged along the vertical direction (first direction) in a left end portion of the display unit 101. The second display item group 300b includes a plurality of display items 307 to 312 arranged along the vertical direction along a right end portion of the display unit 101.

The display items 301 to 312 are assigned respective specific functions. More specifically, the display item 301 is a focus mode setting button. The display item. 302 is a flash setting button. The display item 303 is a self-timer setting button. The display item 304 is a continuous imaging setting button. The display item 305 is an exposure compensation button. The display item 306 is a display switching button. The display item 307 is an International Organization for Standardization (ISO) sensitivity setting button. The display item 308 is a white balance setting button. The display item 309 is a compression ratio setting button. The display item. 310 is a number-of-recording-pixels setting button. The display item 311 is a photometric method setting button. The display item 312 is a return button.

If a touch operation including a touch-down and a touch-up is detected in the display area of any one of the display items through the touch panel 108, the system control unit 207 executes the function assigned to the corresponding display item. For example, if the user performs a touch operation including a touch-down and a touch-up in the display area of the display item 301, the mode of the system control unit 207 shifts the current screen to a screen enabling the selection of a focus mode, e.g., an autofocus mode or a manual mode, and displays it. If, for example, the user performs a touch operation including a touch-down and a touch-up in the display area of the display item 312, the system control unit 207 cancels the FUNC menu screen and displays a live view image 313 on the entire surface of the display unit 101.

The display items 301 to 312 illustrated in FIG. 3A are mere examples. In a case where the mode selection switch 103 is set to the moving image recording mode, it is possible to assign, for example, a frame rate setting button to one of the display items. In a case where the mode selection switch 103 is set to the reproduction mode, it is possible to assign, for example, an erasure button to one of the display items. In a case where the mode selection switch 103 is set to the reproduction mode, the display items 301 to 312 are displayed on a reproduction image in a superimposed manner.

FIG. 3B is a simplified diagram of FIG. 3A for ease of description. Hereinafter, the display items 301 to 311 are referred to as display items "1" to "11", respectively.

A specific description is given below of control for rearranging the display items "1" to "11" as desired by the user. The management table stored in the non-volatile memory 210 stores information indicating that the return button assigned to the display item 312 illustrated in FIG. 3B cannot be moved from the top of the second display item group 300b and cannot be rearranged. As described above, frequently-used display items are prevented from being rearranged.

Figures 1, 8A:
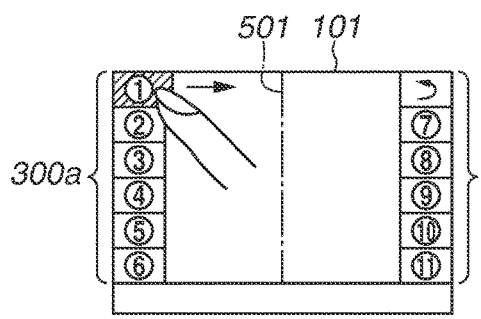
Figures 1, 8B:
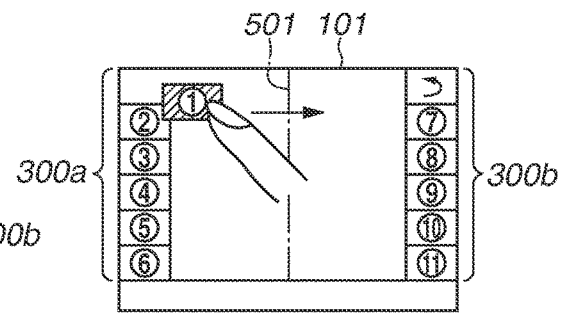
Figures 2, 8A:
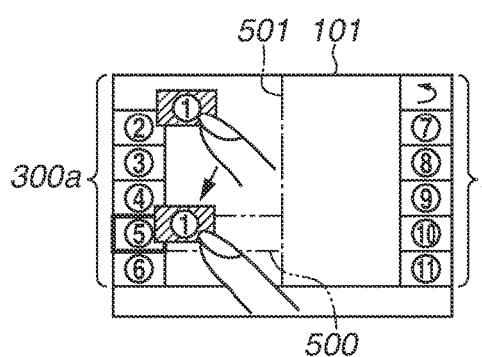
Figures 2, 8B:
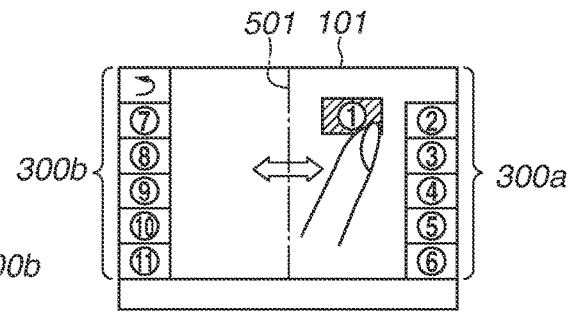
Figures 3, 8A:
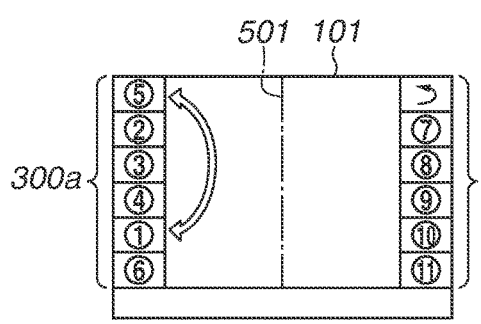
Figures 3, 8B:
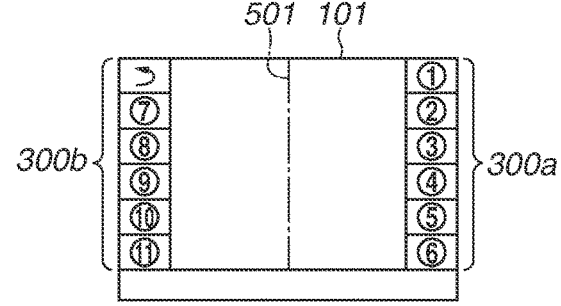
Figures 4, 8B:
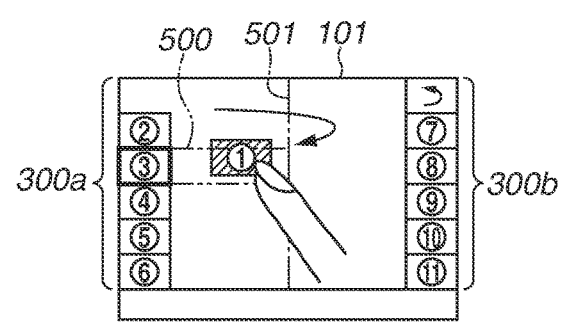

FIG. 4 (consisting of FIGS. 4A and 4B) is a flowchart illustrating rearrangement control of display items according to the present exemplary embodiment. The flowchart illustrated in FIG. 4 is implemented by the system control unit 207 loading a program stored in the non-volatile memory 210 into the system memory 211 and executing the program. The flowchart illustrated in FIG. 4 is started by, for example, when the user presses the menu button, the system control unit 207 displaying the menu screen.

First, in step S401, the system control unit 207 determines whether the customization of display items is selected by the user from among selection items on the menu screen. If the customization is selected (YES in step S401), the processing proceeds to step S402. If the customization is not selected (NO in step S401), the processing proceeds to step S421.

In step S402, the system control unit 207 determines whether "rearrangement" is selected by the user from among various items for the customization. If an item other than "rearrangement" is selected (NO in step S402), the processing proceeds to step S403. If "rearrangement" is selected (YES in step S402), the processing proceeds to step S404.

In step S403, the system control unit 207 executes customization other than "rearrangement", and the processing returns to step S401.

In step S404, the system control unit 207 displays display items on the display unit 101 so that the user can rearrange the display items by a touch operation. More specifically, the system control unit 207 refers to the management table of display items, acquires information of display items according to the operation mode set using the mode selection switch 103, and displays a plurality of display items based on the acquired information. As a result, the display items are displayed on the display unit 101 at positions similar to those in FIG. 3A. At this time, as for a display item that cannot be rearranged, the system control unit 207 can display the display item in such a manner that the user can identify the fact that the display item cannot be rearranged.

In step S405, the system control unit 207 determines whether any of the display items are couched by the user, i.e., whether a touch-on is performed on any of the display items. In other words, the system control unit. 207 determines whether a touch-down is performed on any rearrangement candidate display items. At this time, if a touch-down is detected, the system control unit 207 acquires a touched position through the touch panel 108 (a touch position). Next, the system control unit 207 determines whether the acquired touch position is included in the display area of any one of the display items. The system control unit 207 holds a touch-down position, which is the touch position at this time, in the system memory 211. If the touch position is not included in the display area of any one of the display items (NO in step S405), the processing proceeds to step S406. If the touch position is included in the display area of any one of the display items (YES in step S405), the processing proceeds to step 3407.

In step S406, the system control unit 207 determines whether the user selects the end of "rearrangement". If the end of "rearrangement" is not selected (NO in step S406), the processing returns to step S405. If the end of "rearrangement" is selected (YES in step S406), the processing proceeds to step S421.

In step S407, the system control unit 207 displays an identification indication for the touched display item so that the user can identify the fact that the display item is being touched. In the present exemplary embodiment, the system control unit 207 enlarges the outline of the display item in the horizontal direction and also changes the color of the display item to a color different from that before the display item is touched, to display the display item. The present exemplary embodiment, however, is not limited thereto. Alternatively, the system control unit 207 can change the outer frame of the display item to a thick frame or change the color of the outer frame to a color different from that before the display item is touched. The display item can be displayed so that the user can identify the fact that the display item is being touched.

The system control unit 207 detects a touch operation including a touch move for moving the display item touched by the user, while the user keeps touching the display item, thereby dragging the display item. Herein, "dragging" refers to moving the display item to follow the touch move.

In a case where a display item that cannot be rearranged is being touched, the system control unit 207 does not display an identification indication for the display item and does not drag the display item.

In step S408, the system control unit 207 detects the amount of movement of the touch move through the touch panel 108 and determines whether the amount of movement is greater than or equal to a predetermined distance. In this case, "the amount of movement of the touch move" refers to the linear distance from the position where the touch is started in step S405 to the current position of the touch. The predetermined distance is pre-stored in the non-volatile memory 210. In the present exemplary embodiment, the predetermined distance is set to 20 pixels. In this case, it is assumed that the display unit 101 has 1360 pixels in the horizontal direction (on the long side) and 768 pixels in the vertical direction (on the short side). It is assumed that the size of a single display item is 165 pixels in the horizontal direction (on the long side) and 120 pixels in the vertical direction (on the short side).

If the amount of movement is less than the predetermined distance (NO in step S408), the processing proceeds to step S409. If the amount of movement is greater than or equal to the predetermined distance (YES in step S408), the processing proceeds to step S410.

In step S409, the system control unit 207 determines whether a touch-up is performed on the display item that is being dragged. If a touch-up is performed (YES in step S409), the system control unit 207 cancels the identification indication for the display item and also drops the display item at the position of the touch-up to display the display item. Then, the processing returns to step S405. Herein, "dropping." refers to placing at the position of the touch-up the display item that is being dragged. At this time, the system control unit 207 places the dropped display item in such a manner that the dropped display item is adjusted to fall within the range of the display area before the drag.

If a touch-up is not performed (NO in step S409), the processing returns to step S408. In step S408, the system control unit 207 continuously determines whether the amount of movement is greater than or equal to the predetermined distance.

If the amount of movement is greater than or equal to the predetermined distance in step S408, then in step S410, the system control unit 207 determines whether the direction of the touch move is a second direction. Herein, "the second direction" is a direction orthogonal to the first direction.

Figure 5A:
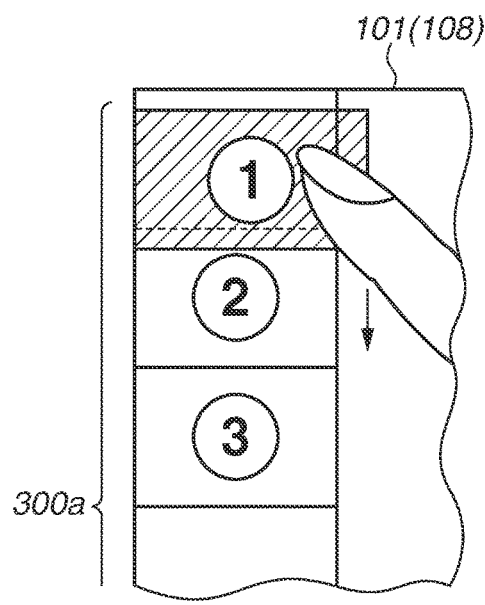
FIGS. 5A to 5C are diagrams illustrating a first direction and a second direction.
Figure 5B:
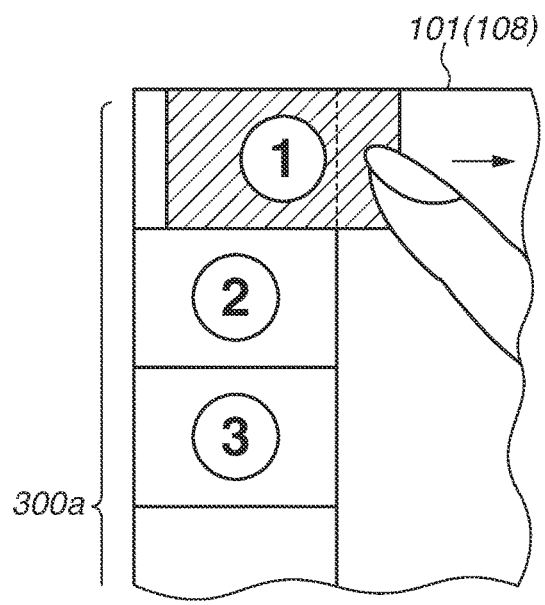
Figure 5C:
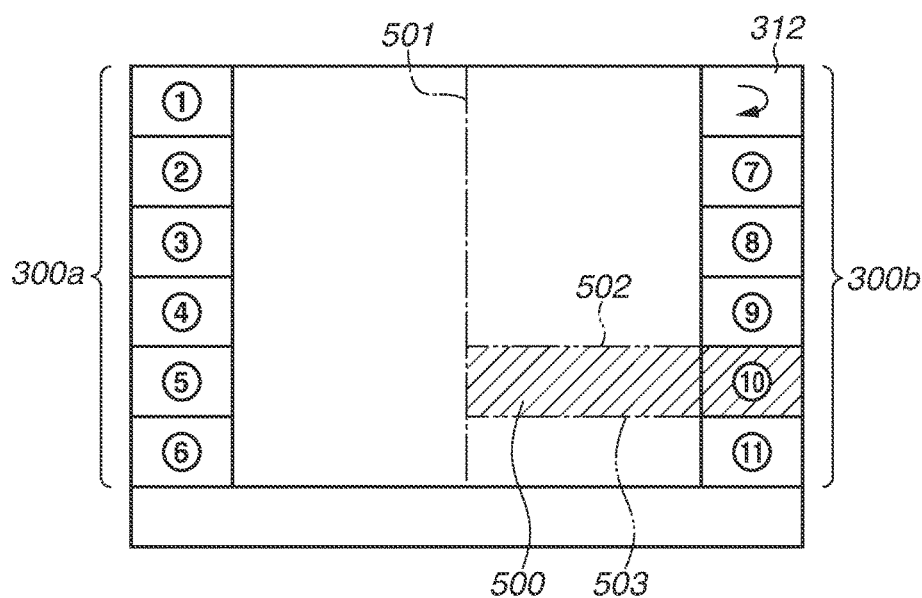

With reference to FIGS. 5A, 5B, and 5C, a specific description is provided of a case where the touch move is performed in the first direction and a case were the touch move is performed in the second direction. In FIGS. 5A and 5B, the system control unit 207 displays the touched display item in a state of enlarging the touched display item "1" in the horizontal direction and also drags the touched display item "1" to follow the touch move.

FIG. 5A is a diagram illustrating a state were the touch move is performed in the vertical direction, which is the first direction. In FIG. 5A, the user performs a touch move on the display item "1" in the down direction toward the display item "2" adjacent to the display item. "1", which is the direction along which the plurality of display items in the first display item group 300a are arranged.

FIG. 5B is a diagram illustrating a state where the touch move is performed in the horizontal direction, which is the second direction. In FIG. 5B, the user performs a touch move on the display item "1" in the right direction, which is a direction orthogonal to the direction along which the plurality of display items in the first display item group 300a are arranged.

The system control unit 207 can detect the direction of the vector connecting the position where the touch is started to the current touch position with a straight line, and based on the detected vector direction, can determine whether a touch move is performed in the second direction. If the detected vector direction is closer to the second direction than to the first direction, the system control unit 207 can determine that a touch move is performed in the second direction. Thus, at the point in time when a touch move having an absolute value of 20 pixels is detected, the system control unit 207 can determine that a touch move is performed in the direction corresponding to the larger one of the component in the first direction (a Y-direction) and the component in the second direction (a direction toward the center of the screen in an X-direction). However, the determination of whether a touch move is performed in the second direction is not limited to this case, and can be made by any method. For example, in the touch move from the touch-down position, the movement component toward the center in the X-direction exceeds 20 pixels, the mode of the system control unit. 207 can shift to a second rearrangement mode. Until the movement component exceeds 20 pixels, the system control unit 207 can perform control in a first rearrangement mode based on the movement component in the Y-direction of the touch move. "The movement, component toward the center in the X-direction" refers to the movement component in the right direction in the case of a touch-down on the display item group 300a, and the movement component in the left direction in the case of a touch-down on the display item group 300b.

If the system control unit. 207 determines that the direction of the touch move is not the second direction (NO in step S410), the processing proceeds to step S411. In step S411, the system control unit 207 rearranges the display items in the first rearrangement mode.

if the system control unit 207 determines, that the direction of the touch move is the second direction (YES in step S410), the processing proceeds to step S415. In step S415, the system control unit 207 rearranges the display items based on the second rearrangement mode.

As described above, the system control unit 207 switches control of rearrangement based on the direction of the touch move.

<First Rearrangement Mode>

A description will now be provided of first rearrangement control based on the first rearrangement mode.

In step S412, the system control unit 207 determines whether, in a state where the display item is being dragged, the touch position of the touch move is located between the upper end and the lower end of another one of the display items that is not being dragged. More specifically, the system control unit 207 can acquire the touch position through the touch panel 108 and make the determination based on whether the acquired touch position is located in the display area of another one of the display items stored in the management table. If it is determined that the touch position of the touch move is located in the display area of another one of the display items (YES in step S412), the processing proceeds to step S413. If it is determined that the touch position of the touch move is not located in the display area of another one of the display items (NO in step S412), the processing proceeds to step S414.

In step S413, the system control unit. 207 moves another display item present at the current touch position in the direction in which the display item that is being dragged has been located before the drag, i.e., in the direction of an original position of the display item that is being dragged, thereby replacing the position of the display item that is being dragged and positions of other display items with each other. Similarly, the system control unit 207 also sequentially replaces the display item that is being dragged and each of the plurality of other display items with each other.

Therefore, in the first rearrangement control, all the plurality of items located between the position (the original position), before the drag, of the display item that is being dragged and the current position of the display item move in the direction in which the display item that is being dragged has been located before the drag.

The first rearrangement control is described with reference to FIGS. 6A-1 and 6A-2. In this case, the user is able to rearrange the display items in such a manner that the display item "1" is inserted between the display items "5" and "6".

FIG. 6A-1 is a diagram illustrating a state where the user touches the display item "1" and then is going to perform a touch move on the display item "1" to the display item "5" in the down direction, which is the first direction.

FIG. 6A-2 is a diagram illustrating a state where the user performs the touch move on the display item "1" to the display item "5" to insert the display item. "1" between the display items "5" and "6", and the display items are rearranged.

When the state in FIG. 6A-1 shifts to the state in FIG. 6A-2, and if it is determined that the touch position is located in the display area of the display item "2" while the display item "1" is being dragged, the system control unit 207 replaces the display item "2" with the display item "1". More specifically, the system control unit 207 moves the display item "2" to the position of the display item "1" before the drag. Next, if it is determined that the touch position is located in the display area of the display item "3", the system control unit 207 moves the display item "3" to the position of the display item "2" before the drag. Similarly, the system control unit 207 also replaces the display items "4" and "5" with the display item "1". As a result, in the state where the order of the plurality of display items "2" to "5" is maintained, the display item "1" is moved to between the display items "5" and "6".

If it is determined that another one of the display items present at the current touch position is a display item that cannot be rearranged, the system control unit 207 does not replace the display item that is being dragged and the display item that cannot be rearranged with each other. For example, even if the user performs a touch move on the display item "7" to the display item 312, which is the return button, the system control unit. 207 does not replace the display item "7" and the return button with each other.

Referring back to the flowchart in FIG. 4, in step S414, the system control unit 207 determines whether a touch-up is performed on the display item that is being dragged. If a touch-up is performed (YES in step S414), the system control unit 207 cancels the identification indication for the display item and also drops the display item at the position of the touch-up, to display the display item. Then, the processing proceeds to step S421.

If a touch-up is not performed (NO in step S414), the processing returns to step S410.

As described above, according to the first rearrangement control, all the plurality of items located between the position, before the drag, of a display item that is being dragged and the current position of the display item can be moved in the direction in which the display item that is being dragged has been located before the drag. Accordingly, in the state where the order of the plurality of items is maintained, the display item that is being dragged can be rearranged. Another display item can move while the display item is being dragged and before the display item is dropped. Thus, the user can easily imagine how the display items are to be rearranged.

(Second Rearrangement Mode)

Next, a description is provided of second rearrangement control based on the second rearrangement mode.

In step S416, the system control unit 207 specifies a candidate for another one of the display items to be replaced with the display item that is being dragged. More specifically, the system control unit. 207 specifies the candidate by determining whether, in the state where the display item is being dragged, the touch position of the touch move is included in any one of specific areas (predetermined areas) of the display items.

In this case, "the specific areas" refer to areas including the display areas of the respective display items. More specifically, with reference to FIG. 5C, a specific area 500 of the display item "10" is described as an example. FIG. 5C illustrates a center line 501 in the horizontal direction of the display unit 101 and an upper end line 502 and a lower end line 503 of the display area of the display item "10". Herein, the specific area 500 of the display item "10" is an area obtained by extending the display area of the display item toward the center line 501. More specifically, the specific area is an area surrounded by the center line 501, the upper end line 502, and the lower end line 503 and indicated by hatching. Similarly, a specific area is also set for each display item. Position information of the specific area is stored in the non-volatile memory 210.

Accordingly, the system control unit 207 can determine whether the touch position is included in any one of the specific areas. Then, the system control unit 207 specifies the display item belonging to the determined specific area as the replacement candidate.

In step S417, the system control unit 207 determines, whether the specified candidate display item is a display item that can be rearranged. More specifically, the system control unit 207 acquires information of the display item from the management table and determines whether the identified candidate display item is a display item that can be rearranged. If the identified candidate display item is a display item that can be rearranged (YES in step S417), the processing proceeds to step S418. If the identified candidate display item is a display item that cannot be rearranged (NO in step S417), the processing returns to step S416.

In step S418, the system control unit. 207 displays the display item belonging to the specific area of the current touch position so that the user can identify the display item as the replacement candidate. More specifically, the system control unit 207 changes the outer frame of the replacement candidate display item to a thick frame, a frame of a different color, or the color of the background, to display the display item so that the display item that is being dragged and the replacement candidate display item can be distinguished from other display items. In the second rearrangement mode, at this time, the system control unit 207 does not replace the display item that is being dragged and the replacement candidate display item with each other.

In step S419, the system control unit 207 determines whether a touch-up is performed on the display item that is being dragged. If a touch-up is performed (YES in step S419), the processing proceeds to step S420. If a touch-up is not performed (NO in step S419), the processing returns to step S416.

In step S420, the system control unit 207 replaces the display item that is being dragged and the replacement candidate display item with each other. More specifically, the system control unit 207 drops the display item that is being dragged at the position of the touch-up, while placing the replacement candidate display item that has been present at the position of the drop, in the display area of the dropped display item before the drag. At this time, the system control unit 207 places the dropped display item after adjusting the dropped display item to fall within the range of the display area where the replacement candidate display item has been displayed. The system control unit 207 places the replacement candidate display item after adjusting the replacement candidate display item to fall within the range of the display area of the dropped display item before the drag.

As a result, in the second rearrangement control, the display item that is being dragged and the replacement candidate display item are replaced with each other, and the other display items do not move.

The second rearrangement control is described with reference to FIGS. 6B-1 to 6B-3. In this case, the user rearranges the display items in such a manner that the positions of the display item "1" and the display item "10" are replaced with each other.

FIG. 6B-1 is a diagram illustrating a state where the user touches the display item "1" and then is going to perform a touch move on the display item "1" in the right direction, which is the second direction.

FIG. 6B-2 is a diagram illustrating the state where the user performs the touch move on the display item "1" to the specific area 500 of the display item "10".

FIG. 6B-3 is a diagram illustrating a state where the display item "1" and the display item "10" are replaced with each other to rearrange the display items.

As illustrated in FIG. 6B-2, the system control unit 207 separates the display item "1" from the first display item group 300a and drags the display item "1" while not moving the display items "2" to "11". Further, the system control unit 207 determines that the touch position is located in the specific area 500 of the display item "10". Then, the system control unit 207 displays the display item "10" in a thick frame so that the display item "10" can be identified as a replacement candidate.

Next, as illustrated in FIG. 6B-3, the system control unit 207 detects a touch-up performed by the user on the display item "1" from the state illustrated in FIG. 6B-2 and then replaces the display item "1" and the display item "10" with each other.

As described above, according to the second rearrangement control, if a touch-up is performed on a display item that is being dragged, the display item that is being dragged is dropped, and a display item that has been present at the position of the drop is also moved to the position of the dropped display item before the drag. Thus, it is possible to replace the display item that is being dragged and the display item present at the position of the drop with each other without affecting other display items. The timing of the replacement is after the display item is dropped, and the display item is not replaced during the drag. Thus, even if, while the user performs a touch move on the display item to a desired display item to be replaced, the display item sequentially passes through the specific areas of other display items, the other display items do not frequently move. This can avoid the situation where the display items are difficult to view.

Referring back to the flowchart in FIG. 4, in step S421, the system control unit 207 determines whether the user selects the end of the customization of display items. If the end of the customization is not selected (NO in step S421), the processing returns to step S401. If the end of the customization is selected (YES in step S421), the system control unit 207 updates position information of the rearranged display items and stores the updated position information in the management table. Then, the processing of the flowchart illustrated in FIG. 4 ends.

Thus, in a case where the FUNC menu screen is displayed in response to the user pressing the FUNC button of the operation unit 106, the system control unit 207 displays the rearranged display items to acquire position information of display items from the updated management table.

As described above, according to the present exemplary embodiment, the rearrangement control of display items is switched according to the moving direction of a touch move of a touched display item while the touched display item keeps being touched. More specifically, the rearrangement control is switched between the first rearrangement control for moving also a display item located between two display items to be replaced with each other, and the second rearrangement control for simply replacing two display items with each other. Thus, the user can rearrange display items based on the switched rearrangement control and therefore can easily rearrange the display items.

In addition, according to the present exemplary embodiment, the rearrangement control can shift to the first rearrangement control and then shift to the second rearrangement control. However, the rearrangement control cannot shift to the first rearrangement control after shifting to the second rearrangement control. This is because if the user performs a touch move for a distance greater than or equal to the predetermined distance in the second direction, it is possible to assume that the user wants to rearrange display items by the second rearrangement control for simply replacing two display items with each other. Therefore, even if the amount of movement of the touch move is less than the predetermined distance in the second direction after that, the mode of the rearrangement control does not shift to the first rearrangement control. Thus, the user can intuitively rearrange display items.

In the present exemplary embodiment, a case has been described where in the second rearrangement control, the display item "1" in the first display item group 300a and the display item "10" in the second display item group 300b are replaced with each other. However, the present invention is not limited to this case. Alternatively, for example, in the second rearrangement control, the display item "1" in the first display item group 300a and any one of the display items "2" to "6" in the first display item group 300a can be replaced with each other.

In the first exemplary embodiment, a case has been described where the rearrangement control is switched between the first rearrangement control and the second rearrangement control. In a second exemplary embodiment, a case will be described where the rearrangement control can also be switched to a third rearrangement control.

Figure 7B:
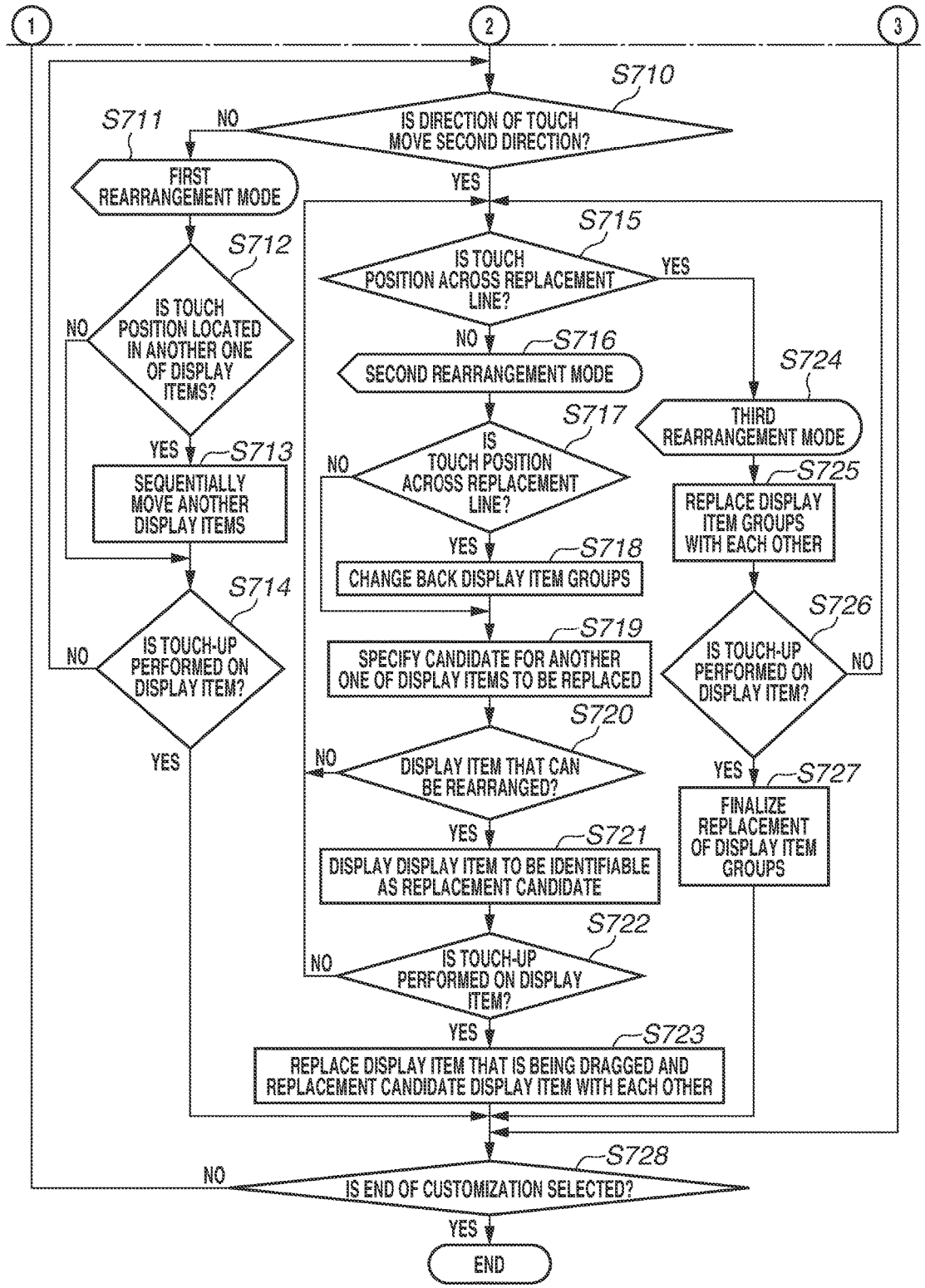
FIG. 7 (consisting of FIGS. 7A and 7B) is a flowchart illustrating rearrangement control according to a second exemplary embodiment.

FIG. 7 (consisting of FIGS. 7A and 7B) is a flowchart illustrating a rearrangement control of display items according to the second exemplary embodiment. The flowchart illustrated in FIG. 7 is implemented by the system control unit 207 loading a program stored in the non-volatile memory 210 into the system memory 211 and executing the program.

The processes of steps S701 to S714 are similar to those of steps S401 to S414 in the first exemplary embodiment, and therefore, the description thereof is appropriately omitted.

If it is determined in step S710 that the direction of the touch move is the second direction (YES in step S710), the processing proceeds to step S715.

In step S715, the system control unit 207 determines whether, in the state where the display item is being dragged, the touch position of the touch move has gone across a replacement line. In the present exemplary embodiment, "the replacement line" refers to an imaginary line set between the first display item group 300a and the second display item group 300b. Position information of the replacement line is stored in the nonvolatile memory 210. In the present exemplary embodiment, it is assumed that the replacement line is the center line 501 illustrated in FIG. 50.

If it is determined that the touch position has not gone across the replacement line (NO in step S715), the processing proceeds to step S716. In step S716, the system control unit. 207 rearranges the display items in the second rearrangement mode.

If it is determined that the touch position has, gone across the replacement line (YES in step S715), the processing proceeds to step S724. In step S724, the system control unit 207 rearranges the display items based on a third rearrangement mode.

As described above, if the direction of the touch move is the second direction, the system control unit 207 switches the rearrangement control based on whether the touch position has gone across the replacement line.

<Second Rearrangement Mode>

The second rearrangement mode in the present exemplary embodiment is similar to that in the first exemplary embodiment, and therefore, just the different processes will be mainly described.

In step S717, the system control unit 207 determines whether the touch position has gone across the replacement line. In this case, as in the case described above where the touch position has gone across the replacement line, a case is assumed where the touch position once has gone across the replacement line, but, after a continuous touch move, returns again to a position that does not go across the replacement line. If the touch position has gone cross the replacement line (YES in step S717), the processing proceeds to step S718. If the touch position does not go across the replacement line (NO in step S717), the processing proceeds to step S719.

In step S718, the system control unit 207 changes hack the display item groups, and displays the display item groups. In the present exemplary embodiment, since the touch position has gone across the replacement line, and the mode of the system control unit 207 shifts to the third rearrangement mode, the system control unit 207 rearranges the display item groups by replacing the display item groups with each other. Thus, the system control unit 207 changes back this rearrangement, and displays the display item groups. The rearrangement of the display item groups in the third rearrangement mode will be described below.

The processes of steps S719 to S723 are similar to those of steps S416 to S420 in the first exemplary embodiment, and therefore, the description thereof is appropriately omitted. However, in the second rearrangement control in the first exemplary embodiment, positions of display items in different display item groups can be replaced with each other, whereas in the second rearrangement control in the second exemplary embodiment, only display items in the same display group can be replaced with each other.

With reference to FIG. 8A-1 to 8A-3, the second rearrangement control is described. In this case, the user rearranges the display items in such a manner that positions of the display item "1" and the display item "5" are replaced with each other.

FIG. 8A-1 is a diagram illustrating a state were the user touches the display item "1" and then is going to perform a touch move on the display item "1" in the right direction, which is the second direction.

FIG. 8A-2 is a diagram illustrating a state where the user performs the touch move on the display item "1" to the specific area 500 of the display item "5".

FIG. 8A-3 is a diagram illustrating the state where positions of the display item "1" and the display item "5" are replaced with each other, and the display items are rearranged.

If the touch position of the display item "1" moves from the left side to the right side across the replacement line, the mode of the system control unit 207 shifts to the third rearrangement mode. Accordingly, as described above, in the second rearrangement control, the display item "1" can replace only a display item in the display item group 300a.

Further, if the processing branches to NO in each of steps S720 and S722, the processing returns to step S715. As a result, based on the determination of whether the touch position has gone across the replacement line in step S715, the mode of the system control unit 207 shifts to either the second or third rearrangement modes. If it is determined, that the direction of the touch move is the second direction, and the processing once proceeds to step S715, the mode of system control unit 207 cannot shift to the first rearrangement mode.

<Third Rearrangement Mode>

Next, a third rearrangement control based on the third rearrangement mode is described.

In step S725, the system control unit 207 replaces the two display item groups with each other. More specifically, the system control unit 207 places the first display item group 300a at the position where the second display item group 300b has been placed, and places the second display item group 300b at the position where the first display item group 300a has been placed. In the present exemplary embodiment, the system control unit. 207 replaces the display item groups with each other by reversing the display item groups in the left and right direction with respect to the replacement line.

In step S726, the system control unit 207 determines, whether a touch-up is performed on the display item that is being dragged. If a touch-up is not performed (NO in step S726), the processing returns to step S715. Thus, based on the determination of whether the touch position has gone across the replacement line in step S715, the mode of the system control unit 207 shifts again to either of the second and third rearrangement modes. If a touch-up is performed (YES in step S726), the processing proceeds to step S727.

In step S727, the system control unit 207 finalizes the replacement of the display item groups. At this time, the system control 207 cancels the identification indication for the dragged display item and places the dragged display item at the previous position in the display item group, where the dragged display item has been placed before the drag.

The third rearrangement control is described, with reference to FIGS. 8B-1 to 8B-4. In this case, the user rearranges the display items groups in such a manner that the positions of the first display item group 300a and the second display item group 300b are replaced with each other.

FIG. 8B-1 is a diagram illustrating a state where the user touches the display item. "1" and then is going to perform a touch move on the display item "1" in the right direction (i.e., second direction).

FIG. 8B-2 is a diagram illustrating a state were the user performs the touch move on the display item "1" across the replacement line to replace the first display item group 300a and the second display item group 300b with each other, and the display item groups are rearranged.

FIG. 8B-3 is a diagram illustrating a state where the user performs a touch-up on the display item "1", to finalize the rearrangement of the display item groups 300a and 300b.

FIG. 8B-4 is a diagram illustrating a state where the touch position returns, to a position that is not across the replacement line from the state of FIG. 8B-2, thereby rearranging the display item groups in such a manner that the replacement of the first display item group 300a and the second display item group 300b is changed back.

If it is determined that the touch position has gone across the replacement line while the display item "1" is being dragged, the system control unit 207 replaces the first display item group 300a and the second display item group 300b with each other as illustrated in FIG. 8B-2. If it is determined that the touch position has gone across the replacement line, but, after a continuous touch move, returns again a position that is not across the replacement line, the system control unit 207 changes back the display item groups, and the display item groups are displayed as illustrated in FIG. 8B-4. This process corresponds to the processes of steps S717 and S718. Thus, according to the position of a touch-up performed on a display item, the replacement of the first display item group 300a and the second display item group 300b is finalized.

A case has been described where the user touches the display item "1" and then performs a touch move on the display item "1". However, aspects of the present invention are not limited thereto. In another exemplary embodiment, the user touches any one of the display items "1" to "11".

Referring back to the flowchart in FIG. 7, in step S728, the system control unit 207 determines whether user selects the end of the customization of display items. If the end of the customization is not selected (NO in step S728), the processing returns to step S701. If the end of the customization is selected (YES in step S728), the system control unit 207 updates position information of the rearranged display items and stores the updated position information in the management table. Then, the processing of the flowchart illustrated in FIG. 7 ends.

As described above, according to the present exemplary embodiment, the rearrangement control of display items is switched according to the touch position of a touch move. More specifically, the rearrangement control is switched between the second rearrangement control for simply replacing two display items with each other and the third rearrangement control for replacing two display item groups with each other. Thus, the user can rearrange display items based on the switched rearrangement control and therefore can easily rearrange the display items.

While aspects of the present invention have been described in detail based on the above exemplary embodiments, the aspects of the present invention are not limited to these specific exemplary embodiments. Aspects of the present invention also include various embodiments without departing from the spirit and scope of the aspects of the invention. The above exemplary embodiments merely illustrate examples of aspects of the present invention, and can be appropriately combined with each other.

In the first exemplary embodiment described above, a case has been described where the first display item group 300a and the second display item group 300b are displayed. However, aspects of the present invention are not limited thereto. Alternatively, either the first display item group 300a or the second display item group 300b alone can be displayed.

In the second exemplary embodiment described above, a case has been described where the replacement line is the center line 501 in the horizontal direction of the display unit 101. Aspects of the present invention are not limited thereto. Alternatively, the replacement line can be shifted to the left or right from the center line.

In the First and Second Exemplary Embodiments described above, a case has been described where in each display item group, a plurality of display items are arranged along the vertical direction. Aspects of the present invention are not limited thereto. Alternatively, the plurality of display items can be arranged along the horizontal direction. In this case, the first direction corresponds to the horizontal direction, and the second direction corresponds to the vertical direction.

A single piece of hardware can perform the above control of the system control unit 207, or a plurality of pieces of hardware can share the processing to control the entire apparatus.

The above-described exemplary embodiments, use, as an example, a digital camera. Aspects of the present invention are not limited thereto, and can be applied to any display control apparatus that detects a touch operation on a display unit. More specifically, aspects of the present invention can be applied to a smartphone, a tablet terminal, a personal computer, a personal digital assistant (PDA), a mobile image viewer, a printer apparatus including a display, a digital photo frame, a music player, a game apparatus, an electronic book reader, etc.

According to aspects of the present invention, a user can easily rearrange display items in the manner the user wishes.

Embodiment (s) of the present invention can also be realized by a computer of a system or apparatus that reads out and executes computer executable instructions (e.g., one or more programs) recorded on a storage medium (which may also be referred to more fully as a non transitory computer-readable storage medium) to perform the functions of one or more of the above-described embodiment (s) and/or that includes one or more circuits (e.g., application specific integrated circuit (ASIC)) for performing the functions of one or more of the above described embodiment(s), and by a method performed by the computer of the system or apparatus by, for example, reading out and executing the computer executable instructions from the storage medium to perform the functions of one or more of the above-described embodiment (s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™) flash memory device, a memory card, and the like.

While aspects of the present invention have been described, with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

This application claims the benefit of Japanese Patent Application No. 2015-198759, filed. Oct. 6, 2015, which is hereby incorporated by reference herein in its entirety.

What is claimed is:

1. A display control apparatus comprising:
one or more processors which, when executing instructions, causes the display control apparatus to:
detect a touch operation on a display unit;
perform control so that a plurality of display items are displayed on the display unit arranged in a first direction;
move a display item from among the plurality of display items via a touch operation which is an operation to move a touched position while keeping a touch on the display unit;
perform, in a case where an amount of movement of the touch operation is greater than a predetermined distance in the first direction and less than a predetermined distance in a second direction different from the first direction, first rearrangement control for moving the display item in the first direction from an original position and moving, from among the plurality of display items, a plurality of items located between the original position of the display item before it is moved and a current position of the display item, in a direction of the original position;
perform, in a case where the amount of movement of the touch operation is greater than or equal to the predetermined distance in the second direction, second rearrangement control for, when the touch operation on the display item ends, inserting the display item at a position corresponding to a position where the touch operation ends and moving another display item located at the position where the display item was inserted to the original position of the display item; and
perform switch rearrangement control based on direction of and the amount of movement of the touch operation.

2. The display control apparatus according to claim 1, wherein the display control apparatus does not perform the first rearrangement control where, as a result of the touch operation continued from a state where the amount of movement of the touch operation is greater than or equal to the predetermined distance in the second direction and the second rearrangement control is performed, a distance in the second direction between a touch position where the touch operation is started and a current touch position of the touch operation is less than the predetermined distance.

3. The display control apparatus according to claim 1, wherein the display control apparatus performs the second rearrangement control where, as a result of the touch operation continued from a state where the amount of movement of the touch operation is less than the predetermined distance in the second direction and the first rearrangement control is performed, a distance in the second direction between a touch position where the touch operation is started and a current touch position of the touch operation is greater than or equal to the predetermined distance.

4. The display control apparatus according to claim 1, wherein in a state where the first rearrangement control is performed, the display control apparatus moves the plurality of display items in the direction of the original position of the display item being moved before inserting the display item being moved.

5. The display control apparatus according to claim 4, wherein the display control apparatus moves, in a state where the first rearrangement control is performed, the plurality of display items in the direction of the original position of the display item being moved when a touch position of the touch operation moves to a display area of another display item not being moved.

6. The display control apparatus according to claim 1, wherein the display control apparatus inserts, when the second rearrangement control is performed, the display item being moved and then moves another display item located at a position where inserting the display item occurs.

7. The display control apparatus according to claim 1, wherein the display control apparatus displays, when the second rearrangement control is performed, another display item not being moved, so that the another display item can be identified as a replacement candidate display item when a touch position of the touch operation moves to a predetermined area of the another display item.

8. The display control apparatus according to claim 7, wherein the predetermined area is an area including a display area of the another display item not being moved and an area obtained by extending the display area in the second direction.

9. The display control apparatus according to claim 1, wherein the display control apparatus displays on the display unit a first display item group in which a plurality of display items are arranged in the first direction and a second display item group in which a plurality of display items are arranged in the first direction, where the first and second display item groups are separated from each other in the second direction, and
wherein the display control apparatus performs third rearrangement control for replacing the first and second display item groups with each other according to a touch operation.

10. The display control apparatus according to claim 9, wherein the display control apparatus sets a replacement line between the first and second display item groups, moves a display item in the first or second display item group by the touch operation, and when a touch position of the touch operation moves across the replacement line, replaces the first and second display item groups with each other.

11. The display control apparatus according to claim 10, wherein, when the touch position moves across the replacement line and then returns to a position that is not across the replacement line, the display control apparatus reverses the replacement of the first and second display item groups.

12. The display control apparatus according to claim 10, wherein in a case where the touch operation on the display item being moved ends, the display control apparatus confirms the replacement of the first and second display item groups according to a position where the touch operation ended.

13. The display control apparatus according to claim 1, wherein the first and second directions are directions orthogonal to each other.

14. A method for controlling a display control apparatus, comprising:
detecting a touch operation on a display unit;
performing control so that a plurality of display items is displayed on the display unit arranged in a first direction;

moving a display item from among the plurality of display items via a touch operation which is an operation to move a touched position while keeping a touch on the display unit;

performing, in a case where an amount of movement of the touch operation is greater than a predetermined distance in the first direction and less than a predetermined distance in a second direction different from the first direction, first rearrangement control for moving the display item in the first direction from an original position and moving, from among the plurality of display items, a plurality of items located between the original position of the display item before it is moved and a current position of the display item, in a direction of the original position;

performing, in a case where the amount of movement of the touch operation is greater than or equal to the predetermined distance in the second direction, second rearrangement control for, when the touch operation on the display item ends, inserting the display item at a position corresponding to a position where the touch operation ends and moving another display item located at the position where the display item was inserted the original position of the display item; and performing switch rearrangement control based on direction of and the amount of movement of the touch operation.

15. A non-transitory computer readable recording medium storing computer executable instructions for causing a computer to execute a method, the method comprising:

detecting a touch operation on a display unit;

performing control so that a plurality of display items is displayed on the display unit arranged in a first direction;

moving a display item from among the plurality of display items via a touch operation which is an operation to move a touched position while keeping a touch on the display unit;

performing, in a case where an amount of movement of the touch operation is greater than a predetermined distance in the first direction and less than a predetermined distance in a second direction different from the first direction, first rearrangement control for moving the display item in the first direction from an original position and moving, from among the plurality of display items, a plurality of items located between the original position of the display item before it is moved and a current position of the display item, in a direction of the original position;

performing, in a case where the amount of movement of the touch operation is greater than or equal to the predetermined distance in the second direction, second rearrangement control for, when the touch operation on the display item ends, inserting the display item at a position corresponding to a position where the touch operation ends and moving another display item located at the position where the display item was inserted the original position of the display item; and performing switch rearrangement control based on direction of and the amount of movement of the touch operation.

* * * * *